US008826430B2

(12) United States Patent
Brdiczka et al.

(10) Patent No.: US 8,826,430 B2
(45) Date of Patent: Sep. 2, 2014

(54) METHOD AND SYSTEM FOR TRACING INFORMATION LEAKS IN ORGANIZATIONS THROUGH SYNTACTIC AND LINGUISTIC SIGNATURES

(71) Applicant: Palo Alto Research Center Incorporated, Palo Alto, CA (US)

(72) Inventors: Oliver Brdiczka, Mountain View, CA (US); Peter Likarish, Jersey City, NJ (US); Priya Mahadevan, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/675,982

(22) Filed: Nov. 13, 2012

(65) Prior Publication Data

US 2014/0137238 A1    May 15, 2014

(51) Int. Cl.
*G06F 21/00* (2013.01)
(52) U.S. Cl.
USPC .............................................. 726/22; 726/32
(58) Field of Classification Search
None
See application file for complete search history.

(56) References Cited

U.S. PATENT DOCUMENTS

| 7,962,491 | B1* | 6/2011 | Shen .............................. 707/749 |
| 8,127,360 | B1* | 2/2012 | Wilhelm et al. ................. 726/25 |
| 8,356,357 | B1* | 1/2013 | Barile et al. ..................... 726/26 |
| 2005/0060643 | A1* | 3/2005 | Glass et al. ................. 715/501.1 |
| 2005/0190948 | A1* | 9/2005 | Isogai .............................. 382/100 |
| 2009/0043767 | A1* | 2/2009 | Joshi et al. ......................... 707/6 |
| 2009/0300751 | A1* | 12/2009 | Krishnamurthy et al. ....... 726/13 |
| 2010/0149570 | A1* | 6/2010 | Kamiya et al. ................ 358/1.13 |
| 2010/0169982 | A1* | 7/2010 | Kakehi et al. .................... 726/28 |
| 2011/0271177 | A1* | 11/2011 | Bastos Dos Santos et al. ............................ 715/256 |

OTHER PUBLICATIONS

Krishnamurthy et al. Detecting Bulk Document Leakage, Nov. 2, 2008.*

* cited by examiner

*Primary Examiner* — Gilberto Barron, Jr.
*Assistant Examiner* — Malcolm Cribbs
(74) *Attorney, Agent, or Firm* — Shun Yao; Park, Vaughan, Fleming & Dowler LLP

(57) ABSTRACT

One embodiment of the present invention provides a system for tracing information leaks. The system introduces linguistic and syntactic changes to a document, and associates these changes with a user identifier, which facilitates identification of a user that may have leaked the document. During operation, the system receives a document. The system then determines a most similar original document based on the received document. The system determines difference between the most similar original document and the received document, and determines a user identifier based on the determined difference.

16 Claims, 4 Drawing Sheets

METHOD AND SYSTEM FOR TRACING INFORMATION LEAKS IN ORGANIZATIONS THROUGH SYNTACTIC AND LINGUISTIC SIGNATURES

BACKGROUND

1.. Field

This disclosure is generally related to information security. More specifically, this disclosure is related to a method and system for tracing information leaks in organizations through syntactic and linguistic signatures.

2.. Related Art

The recent online publications of sensitive government information from various countries reveals the danger of insider leaks and difficulty in preventing information leaks in governments and big organizations. One principal reason that such leaks occur is that organizations consist of people that may or may not be completely loyal to the organization. Access to sensitive information internally is, however, essential for the proper functioning of organizations.

Different attempts to control the information leaks are available. In one approach, a document access control mechanism can stamp a control number on each document. The control number can be stored with the name of the user that accessed the document. Unfortunately, such techniques can be easily defeated by removing the control number.

SUMMARY

One embodiment of the present invention provides a system for tracing information leaks. During operation, the system receives a document. The system determines a most similar original document based on the received document. Then, the system determines difference between the most similar original document and the received document, and determines a user identifier based on the determined difference.

In a variation on this embodiment, determining the user identifier further includes searching among change records for changes that are most similar to the determined difference, and determining the user identifier associated with the changes that are most similar to the determined difference.

In a further variation, determining the user identifier further includes computing a distance value between the determined difference and the changes that are most similar to the determined difference. The system may then determine that the distance value is less than a predetermined threshold, and determines the user identifier based on the computed distance value.

In a variation on this embodiment, the system receives a request for a specific document from a user. The system then retrieves the requested document from a storage. The system determines a change to be applied to the requested document, changes the requested document according to the determined change, and then provides the requested document to the user.

In a further variation, the change includes one or more of replacing a character in the requested document with an alternative character, replacing a word in the requested document with a synonym for the word, determining a part of speech category for the synonym, repeating a character in the requested document, and/or adding typographical errors to the requested document.

In a further variation, the system stores, in a database, the determined changes with a document identifier and a particular user identifier associated with the user.

BRIEF DESCRIPTION OF THE FIGURES

In the figures, like reference numerals refer to the same figure elements.

DETAILED DESCRIPTION

Figure 1:
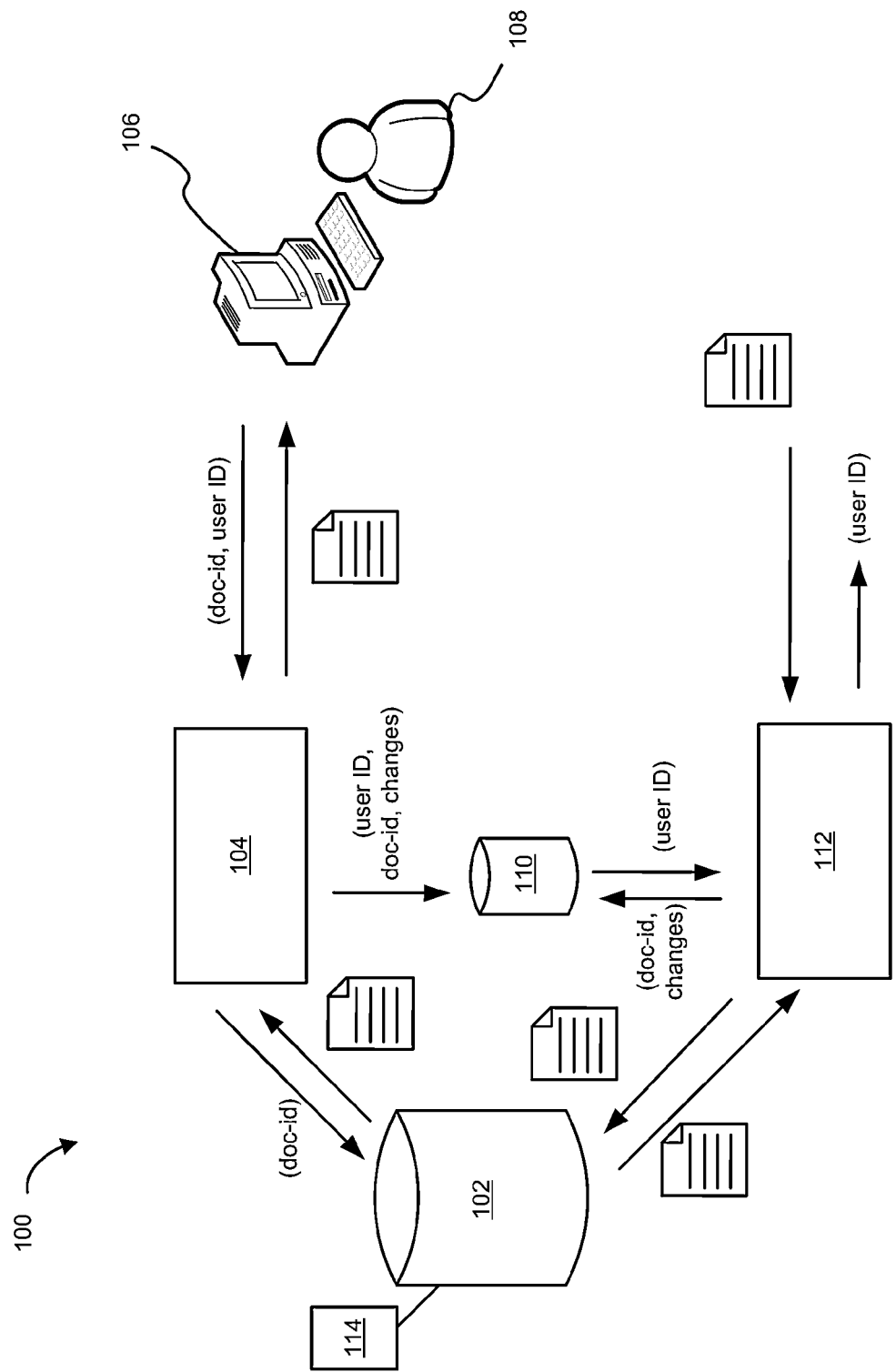
FIG. 1 presents a diagram illustrating an architectural overview of a system for tracing leaked documents, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of countering improper dissemination of documents by adding traceable changes to sensitive documents. Users accessing a sensitive document receive a traceable, changed version of the document. If a user improperly redistributes the document, then a document protection system can determine that the user is the probable source of the improper distribution by backtracing the changes. The changes are not apparent to users and cannot be erased or inferred. The changes reduce the backtracing search space and effectively discourages improper dissemination of confidential documents.

When a user wants to access a sensitive document, the user submits the request to the system. A signing service in the system retrieves the document from a repository. The signing service makes syntactic and/or linguistic changes to the document, thereby generating an undetectable signature in the document. A syntactic change is a change to text that is not based on the meaning of words. A linguistic change is a change based on the meaning of words. One example of a syntactic change is replacing a comma with a semicolon. An example of a linguistic change is replacing a noun (e.g., "phone") with another noun that has the same meaning (e.g., "telephone"). If the system cannot make simple, less intrusive changes to the document, then the system can make more substantial changes. If more substantial changes are not possible or practical, then the system can deny access to the document. Otherwise, the system makes the changes to the document and saves the changes in a change/access database. The system stores an association between a user ID and a changed document ID. The system then provides the changed document to the user.

To determine the probable identity of the person that leaked a document (also referred to herein as the perpetrator), a security administrator submits the disseminated version of the document to the document protection system. The system compares the leaked document with the original documents to determine the most similar original document (e.g., the document without any changes). The system then determines the applied changes, which are the differences between the disseminated document and the most similar original document. Note that the applied changes include any changes to the disseminated document made after the perpetrator initially accesses the document.

The system then determines the user identifier (ID) of the likely perpetrator by searching in the change/access database for the most similar changes. The system searches through the history of changes associated with the most similar original document. Then, the system computes a distance value between the applied changes and the most similar changes. If the distance value is less than a pre-determined threshold value, the system returns the user ID associated with the most similar changes as the likely source of the document leak.

Architectural Overview

FIG. 1 presents a diagram illustrating an architectural overview of a system 100 for tracing leaked documents, in accordance with an embodiment of the present invention. Each request to access a confidential document stored in a shared sensitive information repository 102 is routed through a signing service 104. Signing service 104 receives a request for a confidential document through a computer 106 from a user 108. The request includes a document ID (e.g., unique name or path to the document) and an identifier (e.g., user ID) for the user. Note that user 108 is authenticated by signing service 104. The authentication allows signing service 104 to associate the user ID with any signed documents subsequently provided to user 108. Signing service 104 uses the document ID to retrieve the original document from repository 102.

Signing service 104 then signs the document by changing the document syntactically and/or linguistically. The changes depend on various factors that may include previous requests for the document, previously used combinations of changes, and the nature of the document. Signing service 104 can also vary the changes depending on time, identity or role of user 108, the department user 108 belongs to, or other factors. If all possible trivial changes to the document are exhausted, signing service 104 may deny access to the document. Alternatively, signing service 104 may make more substantial, and possibly more intrusive, changes to the document. Thus, signing service 104 may generate document variants with a greater number of changes.

After signing service 104 makes the changes to the document, signing service 104 saves the user ID, document ID, and document changes to a change/access database 110. Signing service 104 then provides the changed document to the requesting user 108. Note that the crosshatches in the diagram indicate that the document has been changed. The changed document is also referred to herein as a variant.

A verification service 112 can identify the person that is the likely source of a leak. Verification service 112 receives as input the leaked document. A difference analyzer 114 associated with repository 102 searches for the most similar original document available in storage when compared to the leaked document. Examples of techniques that can be used to determine the most similar document are discussed in U.S. patent application Ser. No. 12/760,949, entitled "Method For Calculating Entity Similarities," and U.S. patent application Ser. No. 12/760,900, entitled "Method For Calculating Semantic Similarities Between Messages And Conversations Based On Enhanced Entity Extraction," each of which are hereby incorporated by reference herein. The difference analyzer 114 determines the differences between the leaked document and the most similar original document. Verification service 112 receives, from repository 102, information regarding the differences and the document ID of the most similar original document. Verification service 112 queries change/access database 110 using the determined differences and the identifier of the most similar document.

Change/access database 110 determines the most likely user ID that is the source of the leaked document, along with a distance value. The distance value is a measure of the differences between changes in the leaked document and changes in the most similar document. If the distance value is below a predetermined threshold, the user ID associated with the most similar document is returned as the likely source of the information leak.

Providing Access to a Traceable Document

Figure 2:
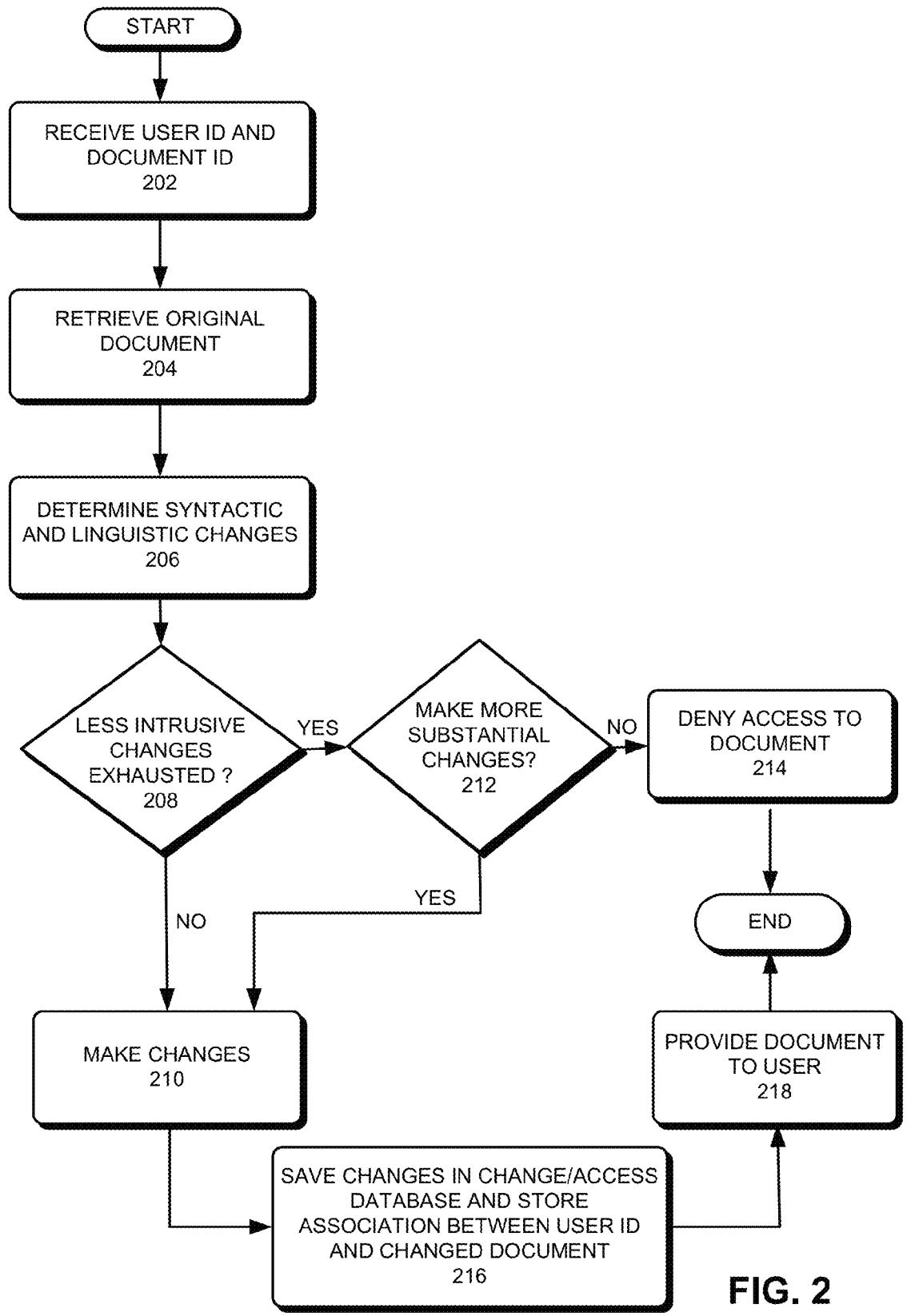
FIG. 2 presents a flowchart illustrating a process for providing access to a traceable document, in accordance with an embodiment of the present invention.

FIG. 2 presents a flowchart illustrating a process for providing access to a traceable document, in accordance with an embodiment of the present invention. During operation, a signing service 104 initially receives a user ID and a requested document ID (operation 202). Signing service 104 retrieves the original document from repository 102 (operation 204). Signing service 104 determines syntactic and linguistic changes (e.g., the signature) to be applied to the original document (operation 206).

Signing service 104 determines whether less intrusive changes to the document have already been exhausted in response to previous document requests (operation 208). If less intrusive changes are available, then signing service 104 makes the changes to the document (operation 210). Signing service 104 saves the changes in change/access database 110 (operation 216), including storing an association between the user ID and the changed document, and then provides the changed document to the user (operation 218).

If less intrusive changes are unavailable, then signing service 104 determines whether to make more substantial changes (operation 212). Such a determination may be made according to a system policy set by the administrator. If signing service 104 does not make more substantial changes, signing service 104 denies access to the document (operation 214). If signing service 104 proceeds to make more substantial changes to the original document, signing service 104 can make the changes (operation 210), and save the changes in change/access database 110 (operation 216). Signing service 104 then provides the changed document to the user (operation 218). Otherwise, signing service 104 denies access to the document (operation 214).

For each access or download of the document, signing service 104 can also store the signature, access time, name of accessing user, and/or IP address. Signing service 104 records the exact location and context (e.g., surrounding words) of all the changes within the text, and transfers the changes to change/access database 110. The recorded context enables the correct identification of the leaked document even if additional changes have been applied by others to the document after dissemination.

Generating Variants of a Document

To facilitate traceability, the system generates variants of a document that are as close as possible to the original document. Also, the system makes sufficient changes to clearly identify the person that accessed the document. In order to accomplish both goals, the system distributes the changes equally over all parts of the document. To generate a document variant, for example, the system changes the first, then second, then the third paragraph, etc. Once the system changes all paragraphs, the system returns to make changes to the first paragraph, and so on.

The changes can be syntactic or linguistic. For syntactic changes, the system replaces fill and other non-semantic characters with similar ones. Syntactic changes include, but are not limited to, the following:

1. Replace characters in text with alternatives. Examples are provided below:
   Replace <space> characters with alternative <space> character variants (e.g., replace code 23 with code 255 from the ASCII character set)
   Replace sentence or phrase separators with alternatives, e.g., replace ',' with ';'
   Replace quote signs with alternatives, e.g., replace double quotes with single quotes
   Replace bracket characters with alternatives, e.g., replace '(' with '['
   Replace bullet point characters with alternatives, e.g., replace '*' with '+'
   Replace hyphen with underscore, e.g., replace "-" with "_"
2. Repeat certain characters, e.g., replace '.' with '..'
3. Introduce typographical errors such as mixing up characters in words, omitting characters, and adding additional characters. For example, the system can replace 'He received the letter' with 'He recieved the letter', or add an extra character, such as an extra '.' or an extra space. Similarly, a character can be deleted as well.

The system can also apply linguistic changes after applying syntactic changes. In one embodiment, the system avoids applying changes to previous changes, e.g., linguistic changes are only applied to words that have not undergone syntactic changes. Examples of linguistic changes include synonym replacement. The system can replace words with their longer/shorter forms or with a synonym. For example, "phone" is replaced with "telephone" (for nouns) or "phone" is replaced with "call" (for verbs). The system can apply part-of-speech tagging to determine an appropriate category of synonym. Note that the system can also make changes to images (e.g., using steganography).

The system records, within signing service 104, the exact location and context (e.g., surrounding words) of all changes within the text. The system then transfers the recorded change data to change/access database 110. The recorded context enables the system to correctly identify the variant even if changes are applied to the variant after dissemination.

There may be a high number of users accessing a document. If the number of users exceeds the number of change combinations available (even including steganography on graphs and images), then the system can organize the users into groups which are assigned a specific variant. Such groups can be, for example, organized by departments of a company. If a leaked copy of the document is found, the system can clearly identify the user group based on the specific variant.

Note that, in most cases, not only one, but several documents are disseminated. Each of those documents can be associated with a different user group. Various implementations may organize users into user groups for each of those documents and minimize the overlap between those groups for close or related documents (e.g., documents in one repository/directory, or with high similarities). The more documents are disseminated, the more clearly a user can be identified. In various implementations, signing service 104 assures the distribution of users to variants of an original document that minimizes the overlap with user variant distribution to related documents.

Note that documents can be further altered by the user or others after the user initially receives the changed document. The additional changes increase the difficulty of (a) identifying the original document and (b) correctly spotting all the changes introduced to the variant before dissemination. This increases the difficulty of identifying the person that accessed the document.

To address (a), various implementations can use powerful search algorithms that leverage semantic indexing technology, and thus do not need to rely heavily on textual matching. Some of these techniques are described in "Method For Calculating Semantic Similarities Between Messages And Conversations Based On Enhanced Entity Extraction," referenced above.

To address (b), the system can use a redundant coding scheme that incorporates more changes than necessary to the document variant, in order to anticipate data loss. The number of change redundancy depends on: (1) the expected average data loss, e.g., the number of changes that are normally applied to documents after dissemination, and 2) the number of documents in a repository and the probability of these documents being disseminated together. While higher values in (1) require more changes to generate one variant, higher number of documents and probability values of (2) make it possible to greatly reduce necessary redundancy of the coding scheme.

In some embodiments, the system varies the changes to the document according to a rolling time sequence. That is, the changes can be a function of time and/or date, as well as recipient identity. Since there may be limited number of changes available, the system can also repeat the same changes after a period of time. For example, the changes can repeat every six months. Within the six-month period, the changes can be all unique, albeit the changes may be incremental. Various implementations can maximize the time between rotating changes. Further, the system can also provide the same changes of the same document to the same recipient at different times.

Identifying a User that Likely Leaked a Document

Figure 3:
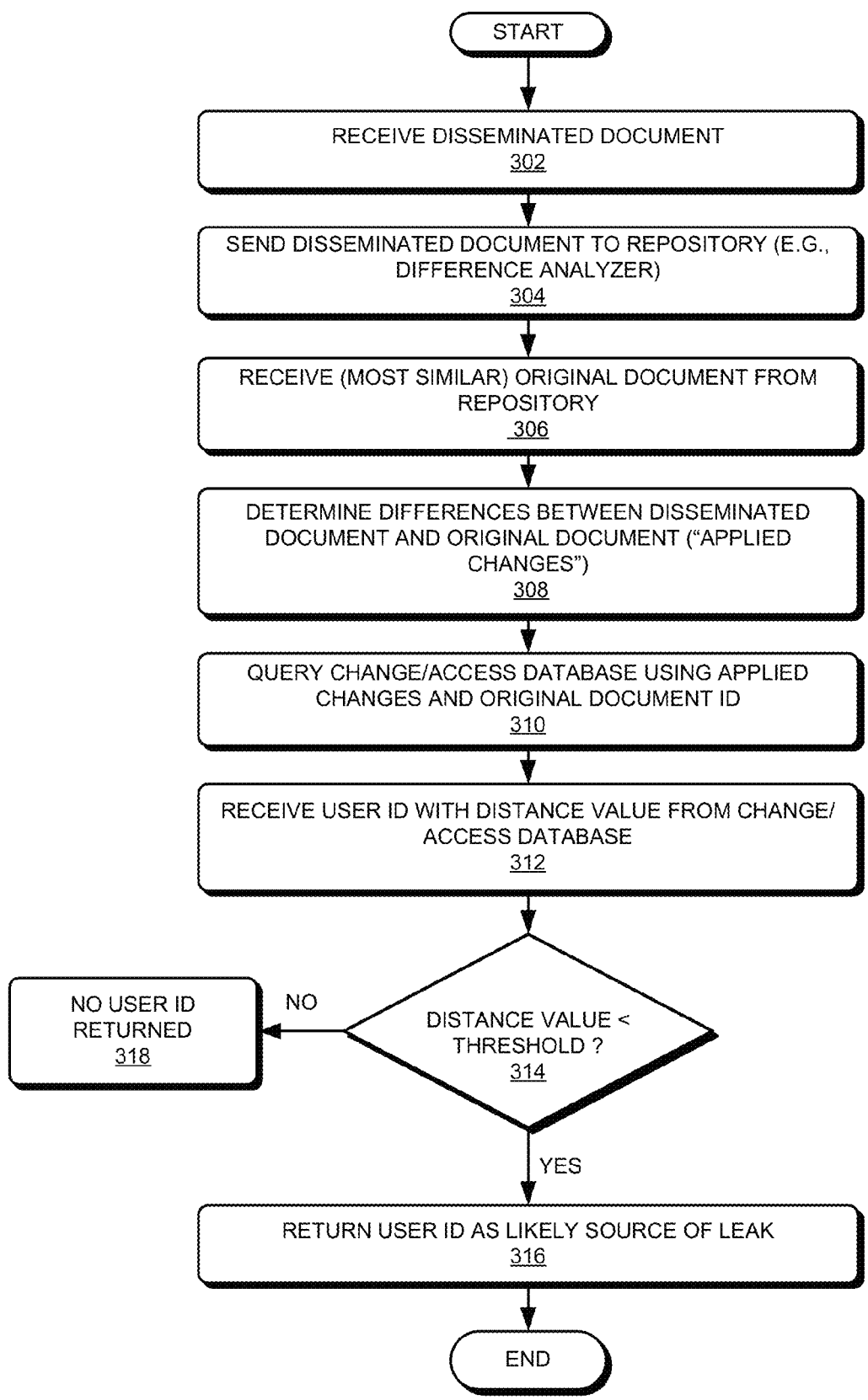
FIG. 3 presents a flowchart illustrating a process for identifying a user that likely leaked a document, in accordance with an embodiment of the present invention.

FIG. 3 presents a flowchart illustrating a process for identifying a user that likely leaked a document, in accordance with an embodiment of the present invention. During operation, verification service 112 receives a disseminated document from a security administrator (operation 302). Verification service 112 sends the disseminated document to repository 102 (operation 304). Next, difference analyzer 114 determines the most similar original document corresponding to the disseminated document. Verification service 304 receives the most similar original document from repository 102 (operation 306).

Subsequently, verification service 112 determines the differences between the disseminated document and the most similar original document (operation 308). The differences are also referred to herein as applied changes, and include changes that may have been made by other people after initial dissemination. Next, verification service 112 queries change/access database 110 using the applied changes and the original document ID (operation 310). Change/access database 110 determines the most similar changed document, based on historical records of changes. Change/access database 110 also determines the user ID of the person that received the most similar changed document and computes a distance value.

The distance value represents the differences between two sets of changes, which are 1) the changes made by the system to the most similar changed document and 2) the applied changes. In some embodiments, the system may compute a cosine similarity as the distance value. The cosine distance of two documents is defined by the angle between their feature vectors which are, e.g., word frequency vectors. The system may also compute an Extended Jaccard Coefficient to compare documents, and measure the similarity by comparing the size of overlap against the size of two sets. In some implementations, the system may compute a Hamming distance as the distance value, which counts the number of positions at which the corresponding symbols are different.

Verification service 112 receives the distance value and the user ID from change/access database (operation 312). Verification service 112 compares the distance value to a predetermined threshold value (operation 314). If the distance value is less than the predetermined threshold, verification service 112 returns the user ID as the likely source of the information leak (operation 316). If the distance value is greater than the predetermined threshold, verification service 112 does not return a user ID (operation 318). Verification service 112 can display a message indicating that no match was found. In some embodiments, verification service 112 can display the user ID and indicate that a confidence level for the user ID, as the predicted source of the improper document dissemination, is below the requisite threshold.

Exemplary Computer System for Tracing Information Leaks

Figure 4:
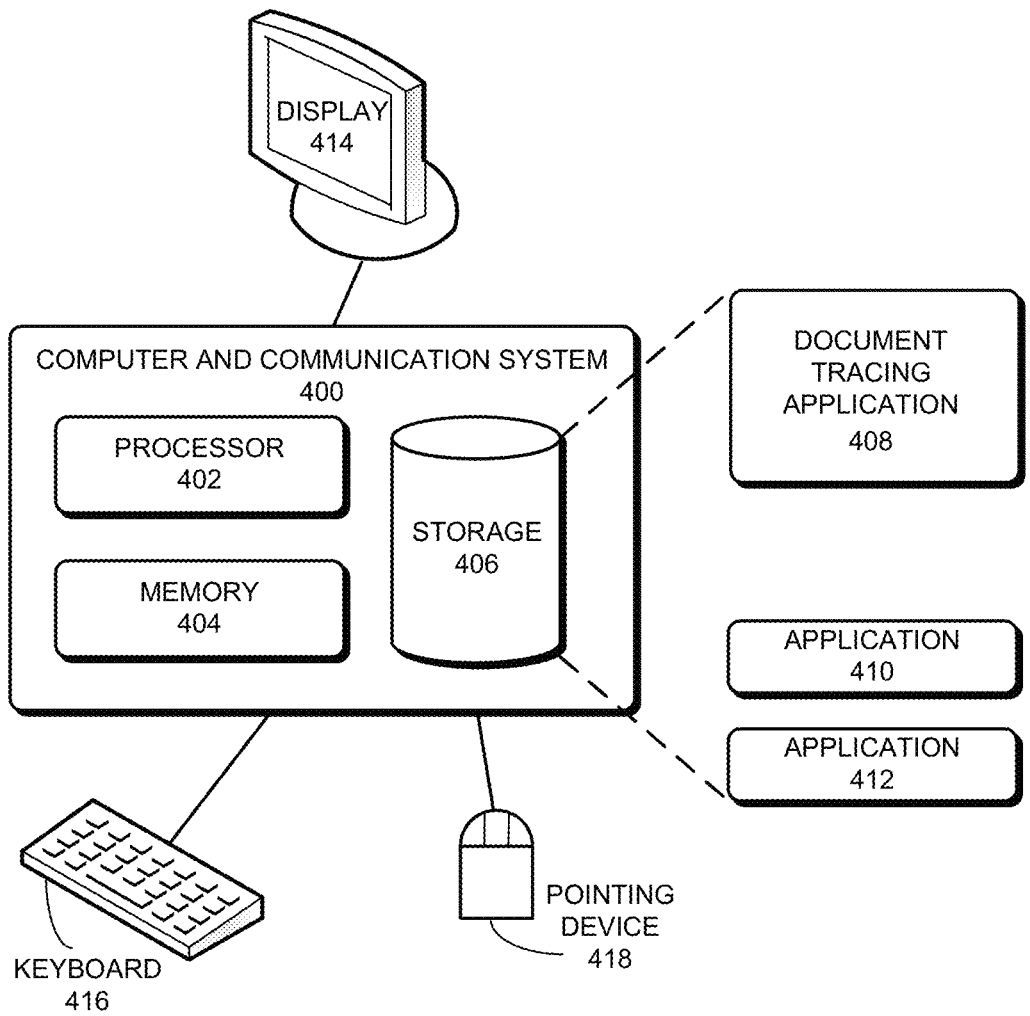
FIG. 4 illustrates an exemplary computer system for tracing leaked documents, in accordance with one embodiment of the present invention.

FIG. 4 illustrates an exemplary computer system for tracing leaked documents, in accordance with one embodiment of the present invention. In one embodiment, a computer and communication system 400 includes a processor 402, a memory 404, and a storage device 406. Storage device 406 stores a document tracing application 408 as well as other applications, such as applications 410 and 412. During operation, document tracing application 408 is loaded from storage device 406 into memory 404 and then executed by processor 402. While executing the program, processor 402 performs the aforementioned functions. Computer and communication system 400 is coupled to an optional display 414, keyboard 416, and pointing device 418. Note that computer and communication system 400 can also be a cluster of computers. This cluster can be located at the same location or can be geographically distributed. Further, storage 406 does not need to be on the same computer, and can be a network storage or over the Internet.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for tracing information leaks, comprising:
    obtaining, by a computing device, a disseminated document to analyze;
    determining, from a collection of original documents, an original document that is most similar to the disseminated document;
    comparing the disseminated document to the most similar original document to determine differences between the disseminated document and the most similar original document;
    querying a database containing changes to documents, using the determined differences, to determine a most similar changed document;
    determining a distance value by comparing changes from the most similar changed document with the determined differences from the disseminated document; and
    responsive to determining that the distance value is less than a threshold value, determining a user identifier for a user associated with the most similar changed document.

2. The method of claim 1, further comprising:
    searching among change records for changes that are most similar to a determined difference between a second most similar original document and a second disseminated document; and
    determining a second user identifier associated with the changes that are most similar to the determined difference.

3. The method of claim 1, further comprising:
    receiving a request for a specific document from a user;
    retrieving the requested document from a storage;
    determining a change to be applied to the requested document;
    changing the requested document according to the determined change; and
    providing the requested document to the user.

4. The method of claim 3, wherein the change includes one or more of:
    replacing a character in the requested document with an alternative character,
    replacing a word in the requested document with a synonym for the word,
    determining a part of speech category for the synonym,
    repeating a character in the requested document, and/or
    adding typographical errors to the requested document.

5. The method of claim 3, further comprising:
    storing, in a database, the determined changes with a document identifier and a particular user identifier associated with the user.

6. A computing system for tracing information leaks, the system comprising:
    one or more processors,
    a computer-readable medium coupled to the one or more processors having instructions stored thereon that, when executed by the one or more processors, cause the one or more processors to perform operations comprising:
        obtaining a disseminated document to analyze;

determining, from a collection of original documents, an original document that is most similar to the disseminated document;

comparing the disseminated document to the most similar original document to determine differences between the disseminated document and the most similar original document;

querying a database containing changes to documents, using the determined differences, to determine a most similar changed document;

determining a distance value by comparing changes from the most similar changed document with the determined differences from the disseminated document; and responsive to determining that the distance value is less than a threshold value, determining a user identifier for a user associated with the most similar changed document.

7. The computing system of claim 6, further comprising:

searching among change records for changes that are most similar to a determined difference between a second most similar original document and a second disseminated document; and determining a second user identifier associated with the changes that are most similar to the determined difference.

8. The computing system of claim 6, wherein the computer-readable storage medium stores additional instructions that, when executed, cause the one or more processors to perform additional steps comprising:

receiving a request for a specific document from a user;

retrieving the requested document from a storage;

determining a change to be applied to the requested document;

changing the requested document according to the determined change; and providing the requested document to the user.

9. The computing system of claim 8, wherein the change includes one or more of:

replacing a character in the requested document with an alternative character, replacing a word in the requested document with a synonym for the word, determining a part of speech category for the synonym, repeating a character in the requested document, and/or adding typographical errors to the requested document.

10. The computing system of claim 8, wherein the computer-readable storage medium stores additional instructions that, when executed, cause the one or more processors to perform additional steps comprising:

storing, in a database, the determined changes with a document identifier and a particular user identifier associated with the user.

11. A non-transitory computer-readable storage medium storing instructions that when executed by a computer cause the computer to perform a method for tracing information leaks, the method comprising:

obtaining a disseminated document to analyze;

determining, from a collection of original documents, an original document that is most similar to the disseminated document;

comparing the disseminated document to the most similar original document to determine differences between the disseminated document and the most similar original document;

querying a database containing changes to documents, using the determined differences, to determine a most similar changed document;

determining a distance value by comparing changes from the most similar changed document with the determined differences from the disseminated document; and responsive to determining that the distance value is less than a threshold value, determining a user identifier for a user associated with the most similar changed document.

12. The non-transitory computer-readable storage medium of claim 11, wherein the method further comprises:

searching among change records for changes that are most similar to a determined difference between a second most similar original document and a second disseminated document; and determining a second user identifier associated with the changes that are most similar to the determined difference.

13. The non-transitory computer-readable storage medium of claim 11, wherein the computer-readable storage medium stores additional instructions that, when executed, cause the one or more processors to perform additional steps comprising:

receiving a request for a specific document from a user;

retrieving the requested document from a storage;

determining a change to be applied to the requested document;

changing the requested document according to the determined change; and providing the requested document to the user.

14. The non-transitory computer-readable storage medium of claim 13, wherein the computer-readable storage medium stores additional instructions that, when executed, cause the one or more processors to perform additional steps comprising:

replacing a character in the requested document with an alternative character, replacing a word in the requested document with a synonym for the word, determining a part of speech category for the synonym, repeating a character in the requested document, and/or adding typographical errors to the requested document.

15. The non-transitory computer-readable storage medium of claim 13, wherein the computer-readable storage medium stores additional instructions that, when executed, cause the one or more processors to perform additional steps comprising:

storing, in a database, the determined changes with a document identifier and a particular user identifier associated with the user.

16. The method of claim 1, wherein the changes associated with the most similar changed document include syntactical changes.

* * * * *